United States Patent [19]

Boman

[11] Patent Number: 5,654,901
[45] Date of Patent: Aug. 5, 1997

[54] LOADING SOFTWARE INTO FIELD TEST EQUIPMENT

[75] Inventor: Benny Boman, Stockholm, Sweden

[73] Assignee: Telefonaktiebolaget LM Ericsson, Stockholm, Sweden

[21] Appl. No.: 380,721

[22] Filed: Jan. 30, 1995

[51] Int. Cl.⁶ ................................................ H04M 3/22
[52] U.S. Cl. ................... 395/712; 364/579; 379/1
[58] Field of Search ........................... 364/514 B, 514 C, 364/579, 580; 379/1; 395/200.1

[56] References Cited

U.S. PATENT DOCUMENTS

| | | | |
|---|---|---|---|
| 4,788,637 | 11/1988 | Tamaru | 370/94 X |
| 5,001,740 | 3/1991 | Takano et al. | 379/1 |
| 5,022,028 | 6/1991 | Edmonds et al. | 371/25.1 |
| 5,109,484 | 4/1992 | Hughes et al. | 395/200 |
| 5,155,847 | 10/1992 | Kirouac et al. | 395/600 |
| 5,309,351 | 5/1994 | McCain et al. | 364/132 |
| 5,408,419 | 4/1995 | Wong | 364/514 |
| 5,504,801 | 4/1996 | Moser et al. | 375/29 |
| 5,541,862 | 7/1996 | Bright et al. | 364/580 |
| 5,566,088 | 10/1996 | Herscher et al. | 364/514 B |

FOREIGN PATENT DOCUMENTS

| | | |
|---|---|---|
| 4-157854 | 5/1992 | Japan . |
| 2269032 | 1/1994 | United Kingdom . |

OTHER PUBLICATIONS

J. Saimi, "Workstation Applications for Operation and Maintenance of Cellular Networks", *Proceedings of the Nordic Seminar on Digital Land Mobile Radio Communications (DMR)*, pp. 14.1 1–7, No. Seminar 4, Oslo, Jun. 26, 1990, General Directorate of Posts and Telecommunications, Finland. (XP000515581).

*Primary Examiner*—Edward R. Cosimano
*Attorney, Agent, or Firm*—Burns, Doane, Swecker & Mathis, L.L.P.

[57] ABSTRACT

In a cellular telecommunications system comprising a base transceiver station (BTS) coupled to a base station controller (BSC), a method for testing the BTS begins by connecting an operations maintenance terminal (OMT) to the BTS, the OMT including a first OMT program for performing a desired test. A test program version level is sent from the OMT to the BTS. In the BTS, the test program version level is compared with a BTS program version level. If the test program version level matches the BTS program version level, then the first OMT program is used to perform the desired test. Otherwise, a nonmatch procedure is performed. The nonmatch procedure includes sending a software download request from the BTS to the BSC. In response, a second OMT program is sent from the BSC to the BTS. The BTS then sends the second OMT program to the OMT. Then, the second OMT program is used in the OMT to perform the desired test. The BSC may obtain the second OMT program from an operation support system, so that the fact that a new version of OMT software is being downloaded is transparent to the BSC. In an alternative embodiment, the BTS always initiates the downloading of OMT software to the OMT whenever the OMT initiates a test, without the need for comparing test version levels of the OMT and BTS test programs.

8 Claims, 3 Drawing Sheets

LOADING SOFTWARE INTO FIELD TEST EQUIPMENT

BACKGROUND

The present invention relates to a system and method for loading software into field test equipment. More particularly, the invention relates to loading the correct version of application software into field test equipment that may be connected to one of a number of base transceiver stations in a cellular telecommunications system.

The principles of operation of a mobile communications system, such as a cellular telephone system, are well known. Essentially, the system is divided into a land-based system and a radio system. Mobile subscribers communicate with any one of a number of base transceiver stations (BTSs) by means of the radio interface. The BTSs are geographically distributed so that as a mobile subscriber roams, he or she will be within the service area of at least one of the BTSs in the system. If, when a call is in progress, the mobile subscriber moves out of range of its assigned BTS and into the range of a neighboring BTS, the cellular telephone system will reassign the mobile subscriber to the neighboring BTS, in a process called "handoff." Management of call handoff, as well as all other aspects of call initiation and termination, are handled by various components of the land based system. The land-based system is also responsible for the routing of calls between mobile subscribers, and for interfacing calls to the public switched telephone network (PSTN).

The many functions of the land-based system are not performed by a single hardware unit, but are instead distributed among a number of components, which are coupled together in a communications network. These components include the above-described BTSs, which provide the radio link between the land-based system and the mobile subscribers. The land-based system may also include a base station controller (BSC) for controlling the high-level operation of as many as one hundred or more BTSs. Switching, call handoff, and other functions are performed by a mobile switching center (MSC) that is coupled to the BSCs in the system.

Because proper operation of the BTSs is of vital importance to the system, routine maintenance is regularly scheduled and performed. Such maintenance is typically performed with the assistance of an operations and maintenance terminal (OMT), which is a type of field test equipment. FIG. 1 illustrates the prior art components and method for performing this maintenance work. As shown in the drawing, a BSC 101 is connected to a number n of BTSs 103-1 ... 103-n, where in a typical system n may be greater than one hundred. If it is desired to perform test and maintenance operations on the BTS 103-1, an OMT 105 is connected to the BTS 103-1 by means of an interface 107, which may be an RS-232 interface. In FIG. 1, this connection is illustrated by a dotted line, to indicate that the connection is not a permanent one. That is, after the testing and maintenance have been performed, the OMT 105 may be disconnected from the BTS 103-1, and brought to a different BTS 103-i (i=2, ..., n), where it may again be used for performing test and maintenance operations.

The OMT 105 includes components that are typically found in a portable computer, such as a processor 109, memory 111 and floppy disk drive 113. To perform the test and maintenance operations, an operator must insert a diskette 115 into the floppy disk drive 113, and load the OMT application software, which is contained on the diskette 115, into the memory 111. After it has been loaded into the memory 111, the operator may invoke the OMT application software to begin the tests.

Upon invocation, the first thing that the loaded OMT application software does is attempt to establish communication with a counterpart BTS program 117 that is installed and running in the BTS 103-1. After communication has been established between the OMT 105 and the BTS 103-1, the test and maintenance procedures are performed under the direction of the loaded OMT application software.

Like most application software, the BTS program 117 is periodically revised and improved, sometimes to account for changes in the hardware features that comprise the BTS 103-1. As a result, the BTS program 117 is associated with a version number that particularly identifies which revision of software is in the BTS 103-1. For the OMT 105 to be able to perform its tasks, it is necessary that the OMT application software 115 be a version that corresponds to the version number of the BTS program 117. If this is not the case, the two programs (i.e., BTS program 117 and OMT application software 115) will be unable to cooperate with one another. What's worse is that the operator may be given no indication of this other than the fact that the OMT 105 is unable to establish communications with the BTS 103-1, which could erroneously be construed as an indication that a more serious hardware problem exists.

In the prior art, this problem has been addressed by requiring that the OMT operator have available a number of different versions of the OMT application software on various floppy disks 115. With this solution, the OMT operator has to keep track of which version of OMT application software belongs with which of the BTSs 103-1 ... 103-n. Whenever a new version of BTS software 117 is made available, the prior art requires that a corresponding new floppy disk, containing OMT application software, be distributed to the OMT operator. This is particularly cumbersome because the BTS software 117 itself is not distributed on floppy disks, but is instead downloaded directly from the BSC 101 in accordance with well-known methods, such as those generally described in copending U.S. application Ser. No. 08/237,988 to Dahlin et al., filed May 4, 1994 entitled "Providing a Master Device With Slave Device Capability Information" which is commonly assigned to the same assignee as the present application, and which is hereby incorporated by reference. Thus, the distribution and cataloging of diskettes is performed only for the benefit of being able to supply the correct version of OMT application software 115 to the OMT 105. Consequently, it is desirable to find a better way of distributing the correct software to the OMT 105 for use with any one of the BTSs 103-1 ... 103-n.

SUMMARY

It is therefore an object of the present invention to provide an apparatus and method that eliminates the possibility of running incompatible versions of BTS software and OMT application software.

It is a further object of the present invention to provide an apparatus and method for supplying OMT application software to an OMT without the need for an OMT operator to keep track of many diskettes.

In accordance with one aspect of the present invention, the foregoing and other objects are achieved in a cellular telecommunications system comprising a base transceiver station (BTS) coupled to a base station controller (BSC). Testing of the BTS begins by connecting an operations maintenance terminal (OMT) to the BTS, the OMT including a first OMT program for performing a desired test. A test program version level is sent from the OMT to the BTS, where the test program version level is indicative of a release level of the first OMT program. In the BTS, the test program version level is compared with a BTS program version level. If the test program version level matches the BTS program version level, then the two programs are compatible with one another, and the first OMT program is used to perform the desired test. If the test program version level does not match the BTS program version level, then new software must be obtained for the OMT. This is done by performing a nonmatch procedure that includes sending a software download request from the BTS to the BSC. In response, a second OMT program is sent from the BSC to the BTS. The BTS then sends the second OMT program to the OMT. Then, the second OMT program is used in the OMT to perform the desired test.

In accordance with another aspect of the invention, the BSC may obtain the second OMT program from an operation support system (OSS), so that the fact that a new version of OMT software is being downloaded is transparent to the BSC.

In accordance with yet another aspect of the invention, the downloading of OMT software from the BTS to the OMT is always performed in response to initiation of test procedures, without the need for comparing test program version levels of the OMT and BTS software.

BRIEF DESCRIPTION OF THE DRAWINGS

The objects and advantages of the invention will be understood by reading the following detailed description in conjunction with the drawings in which.

DETAILED DESCRIPTION

The various features of the present invention will now be described with reference to FIG. 2, which illustrates the pertinent components in a cellular communications system. It should be kept in mind, however, that the inventive concepts of the present invention are not restricted solely to use in cellular communications system. Rather, this system is shown for illustrative purposes only.

Figure 1:
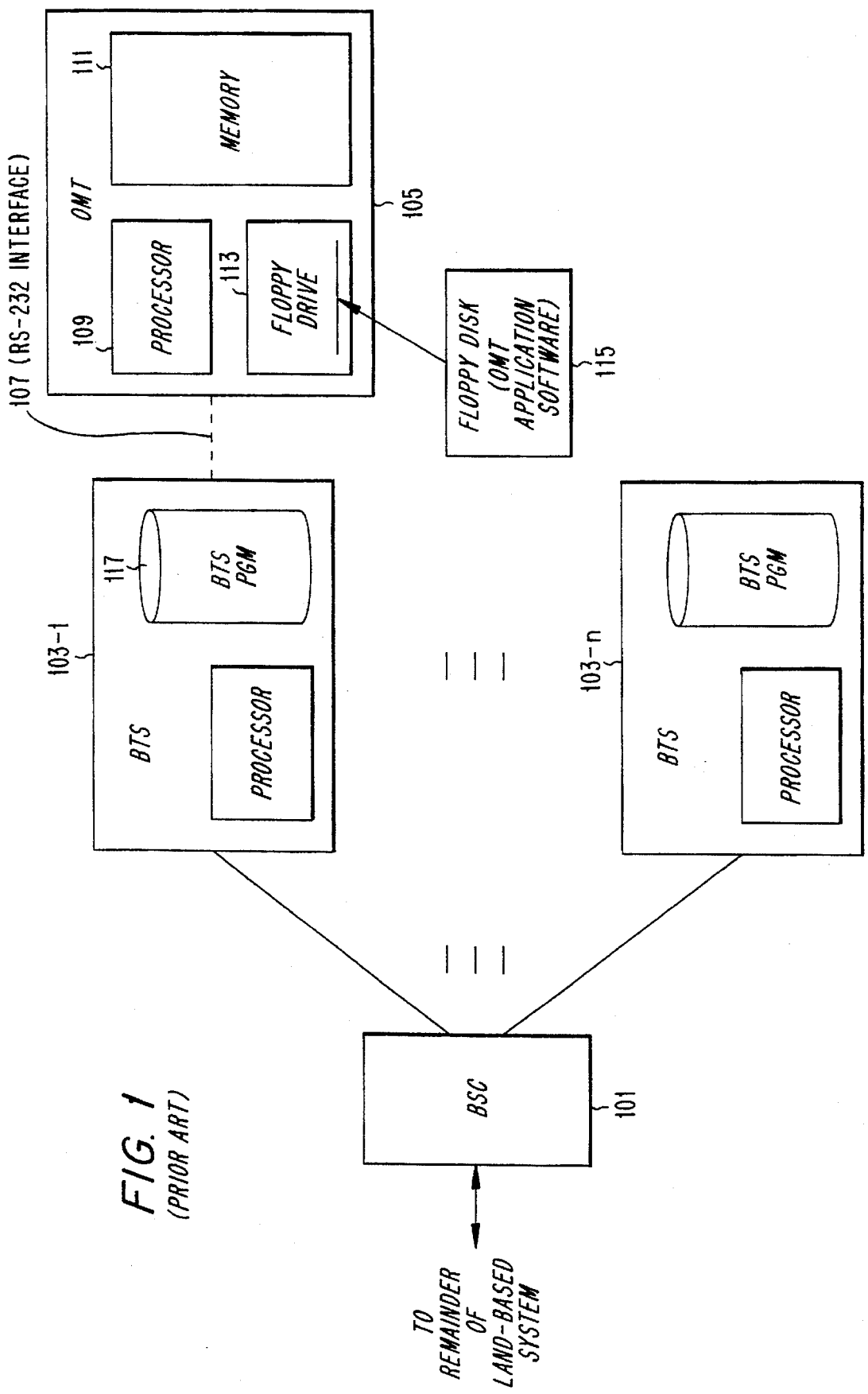
FIG. 1 is a block diagram of the components necessary for performing test and maintenance operations on a cellular telecommunications system in accordance with the prior art.
Figure 2:
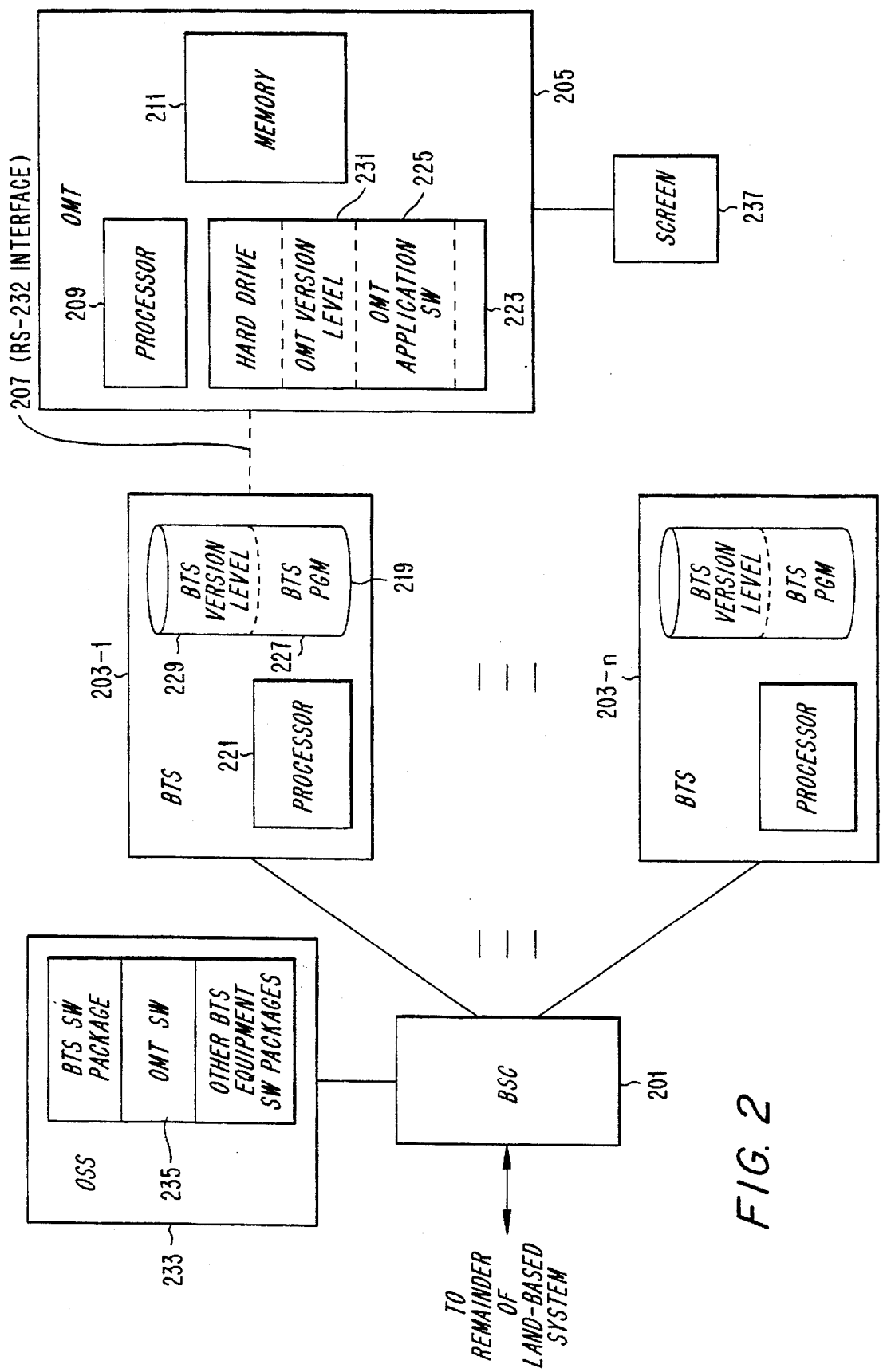
FIG. 2 is a block diagram of the components necessary for performing test and maintenance operations on a cellular telecommunications system in accordance with the present invention.

As shown in FIG. 2, a BSC 201 is connected to a number, n, of BTSs 203-1, ..., 203-n. Each of the BTSs 203-1, ..., 203-n includes a memory 219, which may typically be an erasable programmable read only memory (EPROM) or a "flash memory." A processor 221 within each of the BTSs 203-1, ..., 203-n runs programs stored in the memory 219.

If it is desired to run test and maintenance operations on the first BTS 203-1, an OMT 205 is connected to the BTS 203-1 by means of an interface 207, which may be either a serial or parallel interface. In a preferred embodiment of the invention, the interface 207 is an RS-232 interface. This connection is illustrated as a dotted line in FIG. 2 in order to indicate that the connection is not a permanent one. That is, when the test and maintenance operations have been completed, the OMT 205 may be disconnected from the first BTS 203-1, and brought to a different one of the BTSs 203-i (i=2, ..., n) for use in performing test and maintenance operations there.

The OMT 205 includes components that are typically found in a portable computer, such as a processor 209 and a memory 211. In accordance with a preferred embodiment of the present invention, the OMT 205 further includes a hard drive 223 having stored therein an OMT application program 225.

Figure 3:
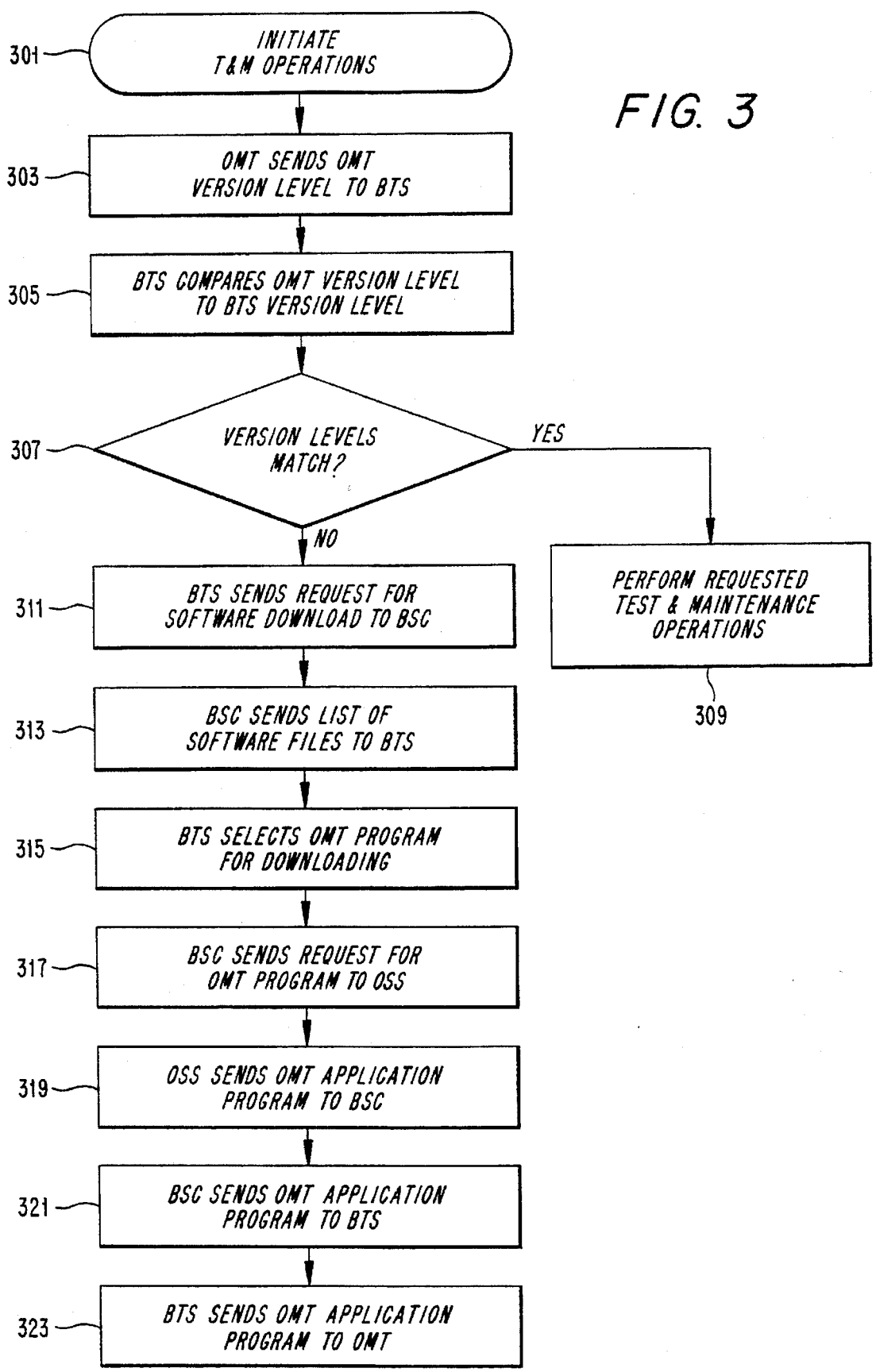
FIG. 3 is a flow chart depicting the operations for performing test and maintenance operations on a cellular telecommunications system in accordance with one embodiment of the present invention.

In accordance with one embodiment of the invention, test and maintenance operations proceed in the following manner, which is also depicted in the flow chart of FIG. 3. After the OMT 205 is connected to the BTS 203-1, the operator of the OMT 205 issues a command (step 301) to initiate the test and maintenance operations embodied in the OMT application program 225. The first thing that the OMT application program 225 does is attempt to establish communications with a BTS program 227. This requires that an OMT version level 231 be sent to the BTS 203-1 (step 303). This operation is performed no matter what version level the BTS program 227 is, so that no incompatibility problems are ever encountered.

Upon receipt of the OMT version level 231, the BTS program 227 compares the OMT version level 231 with a BTS version level 229 stored in the memory 219 (step 305). The next action depends upon the results of that comparison (step 307). If the OMT version level 231 matches the BTS version level 229, then the two programs are compatible, and the requested test and maintenance operations can be performed (step 309). Such operations are application specific, and are not described here in detail.

If the OMT version level 231 does not match the BTS version level 229, then the BTS program 227 informs the OMT 105 of this situation. In response, the OMT 105 may display a message to the OMT operator, asking whether compatible test software should be downloaded from the BSC 101. If the OMT operator answers in the affirmative, or, alternatively, if the OMT 105 is configured to always request compatible software without asking the OMT operator, then the OMT 105 sends the request to the BTS program 227. In another alternative embodiment of the invention, The BTS program 227 can always take it upon itself to send the software download request to the BTS program 227 whenever a version mismatch occurs, without having to first consult with the OMT 105.

In response, the BTS program 227 sends a request for a normal BTS software download to the BSC 201 (step 311). As described above in the BACKGROUND section, downloading software from a BSC 201 to a BTS 203-1 is known in the art. In accordance with a preferred embodiment of the present invention, the downloading operations are performed in accordance with the techniques described in copending U.S. application Ser. No. 08/380,794 to Nils A. L. Löfgren et al., filed Jan. 30, 1995, entitled "Flexible Downloading of Software" which is commonly assigned to the same assignee as the present application, and which is hereby incorporated by reference. The technique described in the Löfgren et al. patent application is modified so that the BSC 201 will respond to a download request from the BTS 203-1 by sending a list of software file identifiers, to the BTS 203-1 (step 313).

In accordance with the invention, this list includes a reference to OMT application software. The BTS 203-1 forms a response that indicates that the OMT application software is wanted (step 315). Note that there is usually no need for the BTS 203-1 to request any other files, since these were already downloaded at the time that the BTS 203-1 was turned on.

If the BSC 201 has direct access to the requested files (i.e., the requested files are stored locally in the BSC 201), then the BSC 201 merely retrieves these files and continues execution at step 321. Alternatively, the BSC 201 need not store any of the files that can be downloaded to the BTS 203-1. Instead, the request for selected files is, in this case, sent to an Operation Support System (OSS) 233 (step 317). This provides the advantage that the fact that OMT software is being downloaded is completely transparent to the BSC 201. The OSS 233 then locates the requested OMT application program from among its stored files 235, and sends this to the BSC 201 (step 319).

Then, the BSC 201 sends the OMT application program to the BTS 203-1 (step 321). The BTS 203-1 recognizes that the received file is destined for the interface 207, and therefore sends the file to the OMT 205 (step 323), which stores the received program onto the hard drive 223.

In a preferred embodiment, the file containing the OMT application software is transferred in a packed (compressed) format, such as either of those produced by the well-known PKZIP or LZSS programs. Consequently, upon receipt in the OMT 205, the OMT application software is unpacked, and the test and maintenance operations are then reinitiated. Unpacking of the OMT application software is preferably performed automatically upon receipt.

In an alternative embodiment of the invention, after the BTS determines that the OMT version level 231 does not match the BTS version level 229 (the "NO" path out of step 307), a message to this effect is sent to a screen 237 that is part of the OMT 205. In response, the OMT operator calls the BSC-site, and asks the BSC operator to perform a software download, which then proceeds as described above. Even though, in this embodiment, the OMT operator must physically intervene to ensure that the OMT test and maintenance operations are performed, it is still unnecessary for him to keep track of what version level to request, since this would be handled automatically by the BSC 201 or the OSS 233.

In yet another alternative embodiment of the invention, the comparison of version levels is dispensed with altogether. Instead, upon initiation of test and maintenance procedures (step 301), the OMT 205 sends a test notification to the BTS 203-1. Upon receiving the test notification, the BTS 203-1 assumes that the OMT 205 will require a downloading of software, and so immediately proceeds to step 311, where the BTS program 227 sends a request for a normal BTS software download to the BSC 201 (step 311). Meanwhile, the OMT 205 automatically enters a state in which it is ready to receive downloaded software. The remainder of the procedure is also as described above with respect to FIG. 3.

The present invention provides a number of advantages over the conventional methods of performing test and maintenance operations. For example, it allows one to update the software in all OMTs 205 in a controlled way, without the need for handling floppy disks. Also, the inventive techniques eliminate the risk that an operator will arrive at a BTS site with the wrong OMT application program 225 installed on his OMT 205, with the result that he is unable to perform his tasks. Finally, the present invention provides an improved method for coordinating the release handling of BTS software and OMT software.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a cellular telecommunications system comprising a base transceiver station (BTS) coupled to a base station controller (BSC), a method for testing the BTS comprising the steps of:

connecting an operations maintenance terminal (OMT) to the BTS, the OMT including a first OMT program for performing a desired test;

sending a test program version level from the OMT to the BTS;

in the BTS, comparing the test program version level with a BTS program version level;

if the test program version level matches the BTS program version level, then using the first OMT program to perform the desired test; and if the test program version level does not match the BTS program version level, then performing a nonmatch procedure comprising the steps of:

sending a software download request from the BTS to the BSC;

sending a second OMT program from the BSC to the BTS;

sending the second OMT program from the BTS to the OMT; and using the second OMT program in the OMT to perform the desired test.

2. The method of claim 1, wherein the BSC obtains the second OMT program from an operation support system.

3. In a cellular telecommunications system comprising a base transceiver station (BTS) coupled to a base station controller (BSC), a system for testing the BTS comprising:

an operations maintenance terminal (OMT), coupled to the BTS, the OMT including a first OMT program for performing a desired test;

means for sending a test program version level from the OMT to the BTS;

in the BTS, means for comparing the test program version level with a BTS program version level;

test invocation means, responsive to an output of the comparing means for using the first OMT program to perform the desired test if the test program version level matches the BTS program version level, and for performing a nonmatch procedure if the test program version level does not match the BTS program version level, the nonmatch procedure comprising the steps of:

sending a software download request from the BTS to the BSC;

sending a second OMT program from the BSC to the BTS;

sending the second OMT program from the BTS to the OMT; and using the second OMT program in the OMT to perform the desired test.

4. The system of claim 3, wherein the test invocation means includes, in the BSC, means for obtaining the second OMT program from an operation support system.

5. In a cellular telecommunications system comprising a base transceiver station (BTS) coupled to a base station controller (BSC), a method for testing the BTS comprising the steps of:

connecting an operations maintenance terminal (OMT) to the BTS;

sending a test notification from the OMT to the BTS;

in response to receipt of the test notification in the BTS, sending a software download request from the BTS to the BSC;

sending an OMT program from the BSC to the BTS, the OMT program being for performing a desired test;

sending the OMT program from the BTS to the OMT; and using the OMT program in the OMT to perform the desired test.

6. The method of claim 5, wherein the BSC obtains the OMT program from an operation support system.

7. In a cellular telecommunications system comprising a base transceiver station (BTS) coupled to a base station controller (BSC), a system for testing the BTS comprising:

an operations maintenance terminal (OMT), coupled to the BTS;

means for sending a test notification from the OMT to the BTS; and test invocation means, responsive to receipt of the test notification in the BTS, for performing a procedure comprising the steps of:

sending a software download request from the BTS to the BSC;

sending an OMT program from the BSC to the BTS, the OMT program being for performing a desired test;

sending the OMT program from the BTS to the OMT; and using the OMT program in the OMT to perform the desired test.

8. The system of claim 7, wherein the test invocation means includes, in the BSC, means for obtaining the OMT program from an operation support system.

* * * * *